(12) United States Patent
Fripp et al.

(10) Patent No.: US 10,801,315 B2
(45) Date of Patent: Oct. 13, 2020

(54) DEGRADABLE ISOLATION DEVICES WITH DATA RECORDERS

(71) Applicant: Halliburton Energy Services, Inc., Houston, TX (US)

(72) Inventors: Michael Linley Fripp, Carrollton, TX (US); John Todd Broome, Highlands Ranch, CO (US); Zachary William Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 252 days.

(21) Appl. No.: 15/755,439

(22) PCT Filed: Oct. 28, 2015

(86) PCT No.: PCT/US2015/057867
§ 371 (c)(1),
(2) Date: Feb. 26, 2018

(87) PCT Pub. No.: WO2017/074365
PCT Pub. Date: May 4, 2017

(65) Prior Publication Data
US 2018/0245448 A1 Aug. 30, 2018

(51) Int. Cl.
*E21B 47/01* (2012.01)
*E21B 47/26* (2012.01)
(Continued)

(52) U.S. Cl.
CPC .............. *E21B 47/00* (2013.01); *E21B 29/02* (2013.01); *E21B 33/12* (2013.01); *E21B 47/01* (2013.01);
(Continued)

(58) Field of Classification Search
CPC ......... E21B 47/01; E21B 47/124; E21B 29/02
See application file for complete search history.

(56) References Cited

U.S. PATENT DOCUMENTS

| 7,543,635 B2 | 6/2009 | East et al. |
| 2008/0149345 A1 | 6/2008 | Marya et al. |

(Continued)

FOREIGN PATENT DOCUMENTS

| CA | 2264632 A1 | 11/1998 |
| CA | 2160968 C | 5/2006 |

(Continued)

OTHER PUBLICATIONS

International Search Report and Written Opinion dated Jul. 26, 2016; International PCT Application No. PCT/US2015/057867.
(Continued)

*Primary Examiner* — Robert E Fuller
(74) *Attorney, Agent, or Firm* — McGuireWoods LLP (57) ABSTRACT

The disclosed embodiments include methods to obtain measurements of a wellbore and data logging devices. In one embodiment, the method includes measuring, by a sensor of a wellbore isolation device, at least one condition of the wellbore proximate to the sensor. The wellbore isolation device has a dissolvable portion, and the sensor is releasable from the wellbore isolation device upon dissolution of the dissolvable portion. The method also includes storing measurements of the at least one condition of the wellbore in a machine-readable medium. The method further includes providing the stored measurements of the sensor to a controller following dissolution of the dissolvable portion.

14 Claims, 4 Drawing Sheets

(51) Int. Cl.
  *E21B 29/02* (2006.01)
  *E21B 33/12* (2006.01)
  *E21B 47/00* (2012.01)
  *G01V 1/52* (2006.01)
  *E21B 47/06* (2012.01)

(52) U.S. Cl.
  CPC .............. *E21B 47/06* (2013.01); *E21B 47/26* (2020.05); *G01V 1/52* (2013.01)

(56) References Cited

U.S. PATENT DOCUMENTS

| | | |
|---|---|---|
| 2011/0186290 A1 | 8/2011 | Roddy et al. |
| 2012/0193090 A1 | 8/2012 | Lopez De Cardenas |
| 2013/0333890 A1 | 12/2013 | Dagenais et al. |
| 2014/0077964 A1* | 3/2014 | Beligere ................. E21B 47/00 340/853.3 |
| 2015/0107825 A1 | 4/2015 | Miller et al. |
| 2015/0107855 A1 | 4/2015 | Murphree et al. |

FOREIGN PATENT DOCUMENTS

| | | |
|---|---|---|
| CA | 2893128 A1 | 7/2014 |
| PL | 222247 B1 | 7/2016 |
| PL | 228478 B1 | 4/2018 |
| WO | 9966172 A1 | 12/1999 |
| WO | 0104460 A1 | 1/2001 |

OTHER PUBLICATIONS

Canadian Office Action dated Nov. 29, 2018, Canadian Patent Application No. 2,995,685.

Poland Search Report dated Jul. 31, 2018; Poland Application No. P.425057.

* cited by examiner

DEGRADABLE ISOLATION DEVICES WITH DATA RECORDERS

FIELD

The present disclosure relates generally to wellbore measuring devices and methods to obtain measurements of a wellbore.

BACKGROUND

Hydraulic fracturing is a technique often used to access resource deposits such as hydrocarbon deposits and other types of resources trapped in a rock formation, such as a shale formation. Hydraulic fracturing is often combined with horizontal drilling to reduce the surface disturbance of the drilling operation, and also to reach multiple hydrocarbon deposits spread across vast areas.

Horizontal drilling technics for forming a wellbore often include vertically drilling from a surface location to a desired subterranean depth, from which point, drilling is curved or at a sub-terrain plane approximately to the surface to connect the wellbore to multiple hydrocarbon deposits. Once the wellbore and support structures have been formed, a perforating gun is lowered down the wellbore and is detonated at multiple locations of the wellbore to generate explosions into the wellbore to create a plurality of perforations along rock formations surrounding the wellbore. A fracking fluid is pumped into the wellbore to create and to augment fractures in the rock formations surrounding the perforations. The fracking fluid may also include particles that help to preserve the structural integrity of the perforations and surrounding fractures during operation of the well.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

The present disclosure relates to data logging devices and methods to obtain measurements of a wellbore. More particularly, this disclosure relates to using data logging devices to measure wellbore conditions, storing the measured wellbore conditions, and providing the measured wellbore conditions to controllers at the surface.

A wellbore may be divided into one or more zones or areas of interest. In some hydraulic fracking operations, a perforation gun is detonated to generate explosions into the formation surrounding a zone to create perforations. A pressurized wellbore fluid is then pumped into the perforations to create and/or to enlarge fractures within the surrounding formations. In other hydraulic fracking operations, a valve or sleeve, such as a sliding sleeve, is activated to provide entry points to the zone. Once the sleeve has been activated, pressurized wellbore fluid is pumped into the well and forced through the entry points into the formation at high pressure, causing the formation surrounding the entry points to fracture. The wellbore may be further prepared for production by packing the fractures with gravel to prevent collapse of the fractures, and to facilitate the flow of hydrocarbon resources into the wellbore. Pre-production and post-production well operations may involve monitoring the conditions of the wellbore and gathering data indicative of the conditions during the foregoing fracking process. Given that wellbores often extend across subterranean planes that are thousands of feet below the surface, however, monitoring and gathering data indicative of the various conditions of the wellbore presents numerous challenges.

To separate the aforementioned zones during hydraulic fracking operations, a wellbore isolation device such as, but not limited to a frac ball, a frac plug, a bridge plug, and a sliding sleeve are often disposed proximate to a zone boundary to isolate a zone from adjacent zones. In accordance with an illustrative embodiment, a sensor operable to measure conditions proximate to the sensor is coupled with the wellbore isolation device before deployment into the wellbore. The sensor measures various conditions of the wellbore as the wellbore isolation device travels down the wellbore. The sensor continues to measure wellbore conditions after the wellbore isolation device is deployed and actuated to seal a zone from an adjacent zone. In an embodiment, the sensor is disposed within a portion of the wellbore isolation device that is formed from a dissolvable material. In an embodiment, the dissolvable portion dissolves when exposed to the wellbore fluid for a period of time and the sensor is released from the wellbore isolation device. The sensor is then carried by the wellbore fluid, which may include released hydrocarbon resources, along a return flow path to the surface. The sensor may continue to measure the conditions of the wellbore along the return flow path and transmit the measured conditions to a detector disposed proximate to the return flow path or proximate to the surface.

Figure 1:
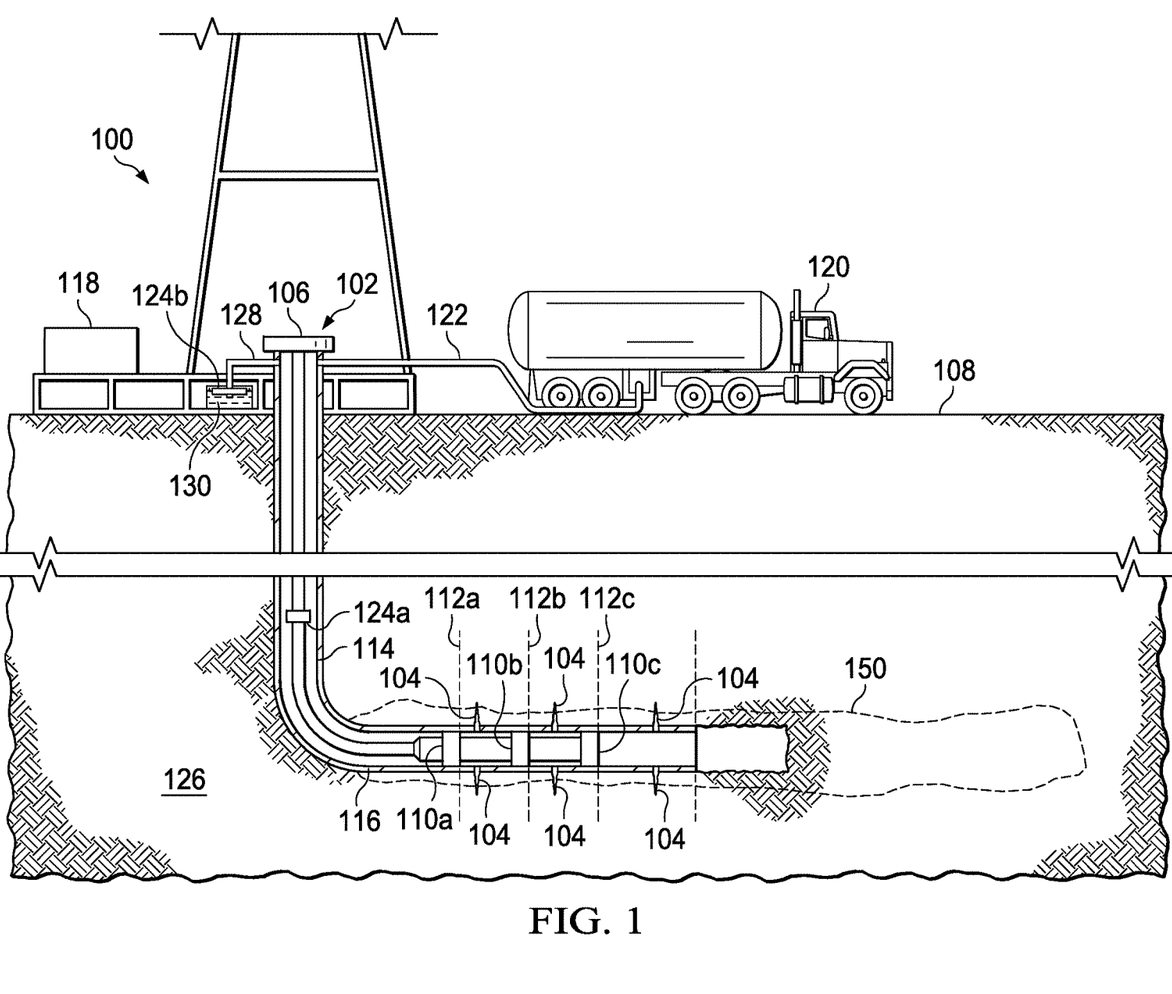
FIG. 1 is a schematic, side view of a hydraulic fracking environment that includes multiple wellbore isolation devices disposed proximate to different zones of a wellbore.

Turning now to the figures, FIG. 1 is a schematic, side view of a hydraulic fracking environment 100 that includes multiple wellbore isolation devices 110a, 110b, and 110c, which are respectively positioned at zone boundaries of zones 112a, 112b, and 112c of a wellbore 114. As shown in FIG. 1, the wellbore 114 extends from surface 108 of well 102, through formation 126, to target region 150. The target region 150 includes the first zone 112a, second zone 112b, and third zone 112c, and may be formed to include additional zones or fewer zones. A tool string 116 is deployed within the wellbore 114. The tool string 116 is operable to supply pressurized fluid to each of the first zone 112a, the second zone 112b, and the third zone 112c to expand perforations 104 at each respective zone.

At the wellhead 106, an inlet conduit 122 is coupled to the fluid source 120 to provide a pressurized wellbore fluid to the well 102. For example, the pressurized wellbore fluid may be pumped through the inlet conduit 122, down the wellbore 114 and into the third zone 112 c to "frac" or fracture the perforations 104 of the zone. Following the fracking operation, the wellbore isolation device 110 c is deployed uphole from the third zone 112 c to seal and isolate the third zone 112 c from other portions of the wellbore 114. The process is then repeated for the second zone 112 b and subsequently the first zone 112 a, using wellbore isolation devices 110 b and 110 a, respectively to isolate the second zone 112 b and first zone 112 a. At the wellhead 106, an inlet conduit 122 is coupled to the fluid source of to provide a pressurized wellbore fluid to the well 102. For example, the pressurized wellbore fluid may be pumped through the inlet conduit 122, down the wellbore 114 and into the third zone 112 c to "frac" or fracture the perforations 104 of the zone. Following the fracking operation, the wellbore isolation device 110 c is deployed uphole from the third zone 112 to seal and isolate the third zone 112 c from other portions of the wellbore 114. The process is then repeated for the second zone 112 b and subsequently the first zone 112 a, using wellbore isolation devices 110 b and 110 a, respectively to isolate the second zone 112 b and first zone 112 a.

The wellbore isolation devices 110a, 110b, and 110c, may be configured to dissolve upon prolonged exposure to wellbore fluids, including upon exposure to certain solvents that may be included in the wellbore fluid. In such embodiments, the components of the isolation device may be water-soluble, oil-soluble, or soluble in the presence of other solvent fluids, such as, but not limited to alcohol based fluids, acetone based fluids, and propanediol based fluids, organic acidic fluids, inorganic acidic fluids, oxidizing fluids, and combinations thereof.

When fluids such as hydrocarbon resources are produced from the well, the produced fluids carry debris and particulate from the wellbore 114, including remnants of dissolved wellbore isolations devices, following dissolution. Such remnants may include insoluble parts, such as data logging devices previously disposed in dissolvable portions of the wellbore isolation devices, that may be carried by the fluids along the fluid return flow path where they are collected in a container 130. In an embodiment, the return flow path includes an annulus between the outer wall of the tool string 116 and the wall of the wellbore 114 and a diverter or outlet conduit 128 that is connected to the container 130. In an embodiment, inline detector 124a and collection container detector 124b are placed downhole and at the surface 108, respectively, to detect data logging devices of the wellbore isolation device as they pass by the detectors 124a and 124b. Operations of the well 102 may be monitored by controllers 118 at the surface 108.

In some embodiments, the tool string 116 is not deployed during the fracking operation. In one of such embodiments, sleeves, such as sliding sleeves are deployed at each zone. More particularly, each sliding sleeve may be activated to provide entry points to a respective zone. Once the sleeve has been activated, pressurized wellbore fluid is pumped into the wellbore 114 and forced through the entry points into the formation at high pressure, causing the formation surrounding the entry points to fracture.

In some embodiments, the wellbore isolation devices 110a, 110b, and 110c, are frac plugs. The wellbore isolation devices 110a, 110b, and 110c may also or alternatively be considered to be a frac ball, a sealing ball, a sliding sleeve, a packer, a bridge plug, a cement sleeve, a wiper, a pipe plug, an ICD plug, an AICD plug, or a similar wellbore isolation device.

In some embodiments, multiple wellbore isolation devices, such as but not limited to, multiple frac plugs, are deployed by the tool string 116 to isolate each of the first, second, and third zones 112a, 112b, and 112c from other portions of the wellbore 114.

Figure 2:
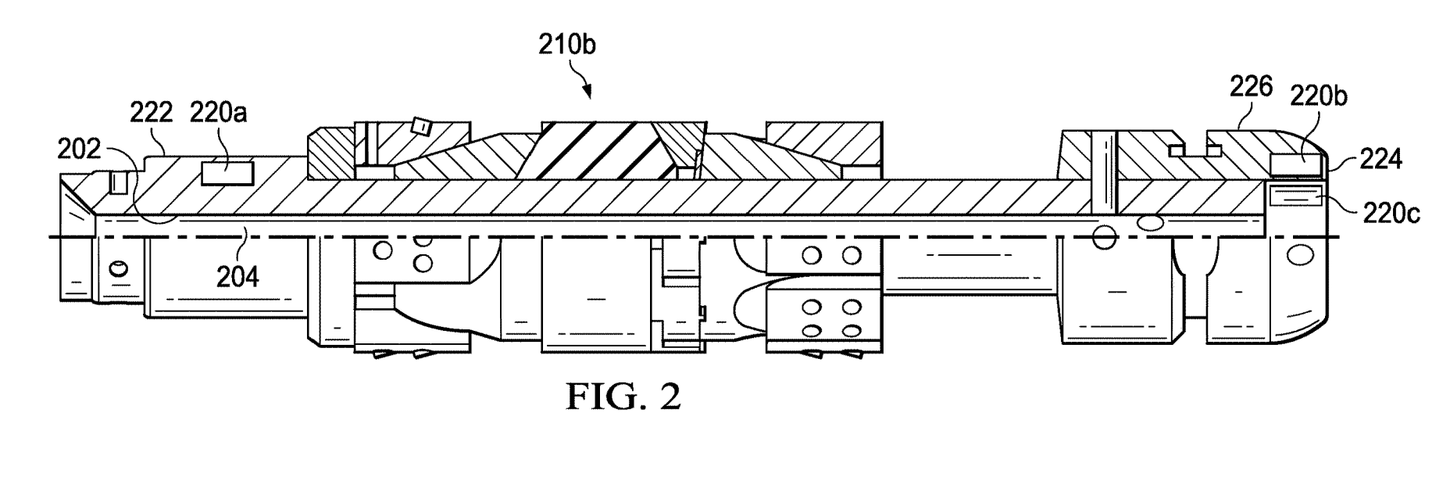
FIG. 2 is a side view of an example of a frac plug deployed within the wellbore of FIG. 1.

FIG. 2 is a side view of an example of a frac plug 210b deployed within the wellbore 114 of FIG. 1. The frac plug 210b may be manufactured using a variety of dissolvable materials, composites, and packer elements. In some embodiments, the frac plug 210b includes a mandrel 202 that defines a flow passage 204 and a sealing ball (not shown). In one of such embodiments, the frac plug 210b has an opening position where fluids such as the pressurized wellbore fluid, may be displaced through the flow passage 204 and a closed position where the flow passage 204 is sealed by the sealing ball. In another one of such embodiments (not shown), an elastomeric element of the frac plug 210b is operable to expand to engage the wellbore 114 to create an isolation zone at the location of the frac plug 210b. In other embodiments, the frac plug 210b includes a solid interior and an expandable external sealing element operable to expand to engage the wall of the wellbore 114 to create an isolation at the location of the frac plug 210b. The frac plug 210b may be compatible with a variety of tools, including but not limited to electric wireline setting tools, slickline setting tools, and hydraulic setting tools.

The frac plug 210b may illustrate any of the first, the second, or the third wellbore isolation devices 110a, 110b, or 110c of FIG. 1. In some embodiments, the frac plug 210b includes a first data logging device 220a, a second data logging device 220b, and a third data logging device 220c. The first data logging device 220a includes an accelerometer and is disposed in an outer diameter portion 222 of the frac plug 210b. The second data logging device 220b includes a vibration sensor and is disposed within a mule shoe portion 226 of the frac plug 210b. The third data logging device 220c includes a temperature sensor and along with an identification tag of the frac plug 210b, are placed on an identification plate 224 of the frac plug 210b. The first, second, and third data logging devices 220a, 220b, and 220c are operable to accurately measure acceleration of the frac plug 210b and measure vibrations and temperatures of the frac plug 210b and surrounding formation. In some embodiments, the identification tag of the frac plug 210b is a radio frequency identification (RFID) tag or a similar electronic component that is operable to transmit an identification of the frac plug 210b without being powered by a power source such as a battery. The identification tag may alternatively include any suitable RF transmitter, including without limitation a near field communication (NFC) device or other suitable active or passive transmitter. In some embodiments, the first, second, and third data logging devices 220a, 220b, and 220c are disposed within or proximate to other portions of the frac plug 210b to allow the respective data logging device to measure wellbore conditions with great precision.

In other embodiments, multiple pressure sensors are disposed at different locations of the frac plug 210b to measure variations of pressure proximate to different portions of the frac plug 210b. In one of such embodiments, a first pressure sensor is disposed at a first portion of the frac plug 210b and operable to measure pressure of the wellbore 114 and formation proximate to the first portion of the frac plug 210b. Further, a second pressure sensor is disposed at a second portion of the frac plug 210b and is operable measure pressure of the wellbore 114 and formation proximate to the second portion of the frac plug 210b.

The frac plug 210b may be deployed at the zone boundary of the first, second, or third zone 112a, 112b, or 112c of the target region 150 illustrated in FIG. 1 to isolate the respective zone 112a, 112b, or 112c from other portions of the wellbore 114 during certain operations of hydraulic fracking. In some embodiments, the target region 150 is several thousand feet underground, making it difficult for surface based sensors to accurately detect or monitor wellbore operations at or proximate to the target region 150. Contrary to surface based sensors, the first, second, and third data logging devices 220a, 220b, and 220c are disposed in the target region 150, and are operable to detect and/or monitor wellbore operations at or proximate to the target region 150 with greater precision relative to surface based sensors.

In some embodiments, the first data logging device 220a includes a housing coupled to the dissolvable portion of the frac plug 210b. The first data logging device 220a also includes at least one sensor component for measuring various conditions of the wellbore 114 proximate to the sensor and a machine-readable medium for storing the measurements of the conditions of the wellbore 114 proximate to the sensor. Similarly, the second and third data logging devices 220b and 220c are also coupled to the dissolvable portion of the frac plug 210b and also each include at least one sensor component and machine-readable medium. In some embodiments, the first data logging device 220a, the second data logging device 220b, and the third data logging device 220c each includes a different sensor component for measuring different wellbore conditions during the deployment of the frac plug 210b.

In some embodiments, the frac plug 210b is partially or completely manufactured from materials that are dissolvable when in contact with the wellbore fluid, which may be the wellbore fluid. Examples of dissolvable materials include, but are not limited to, magnesium alloys, aluminum alloys, polyglycolic acid (PGA), a polylatic acid (PLA), thiol, and polyurethane. In such embodiments, the first, second, and third data logging devices 220a, 220b, and 220c are released from the frac plug 210b following dissolution of at least a part of the frac plug 210b or, more particularly, the component of the frac plug to which the respective data logging device 220a, 220b, or 220c is affixed.

In some embodiments, the first, second, and third data logging devices 220a, 220b, and 220c are encased in materials that are substantially insoluble in the wellbore fluid. As referenced herein, a "substantially insoluble" material is a material that does not degrade or dissolve when exposed to the wellbore fluid or to the hydrocarbon resource for a period of time greater than or equal to a period for drilling, completing, or stimulating the well 102. In such embodiments, the substantially insoluble material is released from the frac plug 210b upon dissolution of the frac plug and is carried from the location of the frac plug 210b, along a return flow path, and into the container 130. In some embodiments, the substantially insoluble material has a lower specific gravity than the wellbore fluid in order to aid the flowback of the first, second, and third data logging devices 220a, 220b, and 220c. In other embodiments, the substantially insoluble material has a lower specific gravity than the data logging devices 220a, 220b, and 220c. In other embodiments, the substantially insoluble material has an increased flow resistance and will more easily be carried in the produced fluid.

Figure 3:
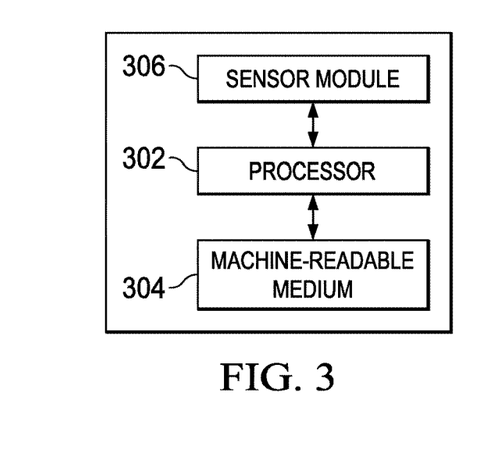
FIG. 3 is a block diagram illustrating an example of a data logging system for measuring conditions of a wellbore, such as the wellbore of FIG. 1.

FIG. 3 is a block diagram illustrating an example of a data logging system 300 for measuring conditions of a wellbore, such as the wellbore 114. Although the system 300 is described with respect to the first data logging device 220a of the frac plug 210b, the system 300 may also be implemented by other data logging devices such as the second data logging device 220b, the third data logging device 220c, or by similar devices operable to measure at least one wellbore condition and to store measurements of the at least one wellbore condition. The system 300 of the first data logging device 220a includes a processor 302, a machine-readable medium 304, a sensor 306, and a power source (not shown).

In some embodiments, the sensor 306 is operable to measure at least one wellbore condition such as temperature, steady state pressure, dynamic pressure, fluid properties, acoustic emissions, vibration, acceleration, magnetic field, or similar wellbore conditions. In some embodiments, the sensor 306 is a microelectromechanical system (MEMS) device. In one of such embodiments, the MEMS device has an outer diameter of approximately ½ inch, a rating of approximately 30,000 psi and approximately 450° F., and is operable to store approximately three million data points. In other embodiments, the sensor 306 includes at least one of an accelerometer, a temperature sensor, a vibration sensor, a magnetometer, a steady state pressure sensor, a dynamic pressure sensor, a fluid sensor, a capacitive sensor, a magnetic permeability sensor, an electrical resistance sensor, an acoustics emissions sensor, or a similar sensor operable to measure a wellbore condition.

The machine-readable medium 304 includes instructions executable by the processor 302 to operate the sensor 306 to measure conditions of the wellbore 114 proximate a dissolvable frac plug 210 before, during, and after fracking. Examples of machine-readable mediums include, but are not limited to, read-only memory (ROM), random access memory (RAM), flash memory, magnetic hard drives, solid state hard drives, FGPAs, as well as other types of similar storage mediums. In some embodiments, the machine-readable medium 304 also includes identifiers of the first data logging device 220b and the frac plug 210b. Further, measurements made by the sensor 306 may also be stored in the machine-readable medium 304.

In some embodiments, the sensor 306 measures at least one condition of the wellbore 114 at a constant rate. In other embodiments, the sensor 306 periodically measures the at least one condition of the wellbore 114. In further embodiments, the processor 302 dynamically determines and adjusts a rate at which the sensor 306 makes measurements based on a condition of the wellbore 114. In one of such embodiments, the sensor 306 is a vibration sensor operable to measure vibrations proximate to the frac plug 210b. In such embodiment, vibrations above a threshold value indicate that at least one perforation gun is being actuated proximate to the frac plug 210b, whereas vibrations below or equal to the threshold value indicate that no perforation gun is being actuated proximate to the frac plug 210b. As such, the processor 302 instructs the vibration sensor to continuously measure vibrations proximate to the frac plug 210b as long as the measured vibrations are above the threshold value and instructs the machine-readable medium to store each of the measured vibration values. However, if the measured vibrations fall below or equal to the threshold value, then the processor 302 instructs the vibration sensor to periodically measure the vibrations proximate to the frac plug 210b, where the rate at which the vibration sensor periodically measures the vibrations is lower than the rate at which the vibration sensor continuously measures the vibrations.

In another one of such embodiments, the sensor 306 is an accelerometer for measuring an acceleration of the first data logging device 220a, or an acceleration of the frac plug 210b if the first data logging device 220a is coupled to the dissolvable portion. In such embodiment, if a motion sensor component of the accelerometer detects that the first data logging device 220a or the frac plug 210b is in motion, or if the accelerometer detects an acceleration above a threshold value, then the processor 302 determines that the first data logging device 220a or the frac plug 210b is travelling along a flow path to the zone boundary or is travelling along a return flow path to the surface 108. The processor 302, based on the foregoing determination, instructs the accelerometer to continue to measure the acceleration of the first data logging device 220a and instructs the machine-readable medium 304 to store each measurement made by the accelerometer as long as the acceleration of the first data logging device 220a is above the threshold value. However, if the sensor 306 determines that the acceleration of the first data logging device 220a and/or the frac plug 210b is below or equal to the threshold value, then the processor 302 determines that the frac plug 210b has been deployed and that the first data logging device 220a remains disposed within the frac plug 210b. The processor 302, based on the foregoing determination, instructs the accelerometer to periodically measure the acceleration of the first data logging device 220a, where the rate at which the accelerometer periodically measures the acceleration of the first data logging device 220a is slower than the rate at which the accelerometer continuously measures the acceleration of the first data logging device 220a.

In another one of such embodiments, the sensor 306 is a temperature sensor for measuring a temperature of the wellbore 114 proximate to the sensor 306. In such embodiment, a temperature below a threshold value indicates that fracking operations are being performed proximate to the location of the frac plug 210b and a temperature at or above the threshold value indicates that fracking operations are not being performed proximate to the frac plug 210b. As such, the processor 302 instructs the temperature sensor to measure the temperature of the wellbore 114 at a first rate if the temperature (or another parameter of interest where additional or other types of sensors are used) is at or above the threshold value. However, if the determined temperature of the wellbore 114 is below the threshold value, then the processor 302 instructs the sensor 306 to determine the temperature (and other parameters of interest where additional or other types of sensors are used) of the wellbore 114 at a second rate, the second rate being different than the first rate. In some embodiments, the processor 302 may reference a time delay from a start time when the sensor 306 is first deployed and delay the taking of measurements using the sensor 306 until the frac plug 210b is deployed at depth within a wellbore.

In a further one of such embodiments, the sensor 306 is operable to measure magnetic field directions and magnitudes proximate to the first data logging device 220a to determine movement of the frac plug 210b. In a further embodiment, the sensor 306 is operable to measure steady state pressure proximate to the first data logging device 220a to determine hydraulic force proximate to the first data logging device 220a. In a further embodiment, the sensor 306 is operable to measure dynamic pressure such as high frequency pressure variations, to determine formation fracture characteristics. In a further embodiment, the sensor 306 is operable to measure acoustic emissions to determine acoustic signatures indicative of formation fracture characteristics or to measure properties of the proppant flow. In each of the foregoing embodiments, the processor is operable to dynamically adjust the measurement rate of the sensor 306 based on wellbore conditions.

In some embodiments, the first data logging device 220a includes multiple sensors 306 operable to measure different conditions of the wellbore 114. In such embodiments, the processor dynamically adjusts rates, at which multiple sensors measure multiple wellbore conditions in response to one wellbore condition. For example, if the vibration sensor determines vibrations above the threshold value, then the processor 302 increases the rate at which the vibration sensor measures vibrations and also increases the rate at which the temperature sensor measures the temperature of the wellbore 114.

In some embodiments, the first data logging device is a passive logging device that does not include power storage. In one of such embodiments, the passive logging device is a radio-frequency identification (RFID). In another one of such embodiments, the passive logging device is a Near Field Communication (NFC) device. Further, the passive logging device includes a transmitter and a receiver. The receiver of the passive logging device is operable to receive a signal from the controller 118, the inline detector 124a and/or the container detector 124b and the transmitter of the passive logging device is operable to transmit a unique identifier of the frac plug 210b to the controller 118, the inline detector 124a, and/or the container detector 124b. The passive logging device does not necessarily make downhole measurements.

In another embodiment, the first data logging device 220a has a wireless data transmission module. The wireless data transmission module may be operable to transmit via magnetic signals, electrical signals, electro-magnetic signals or acoustic signals, data indicative of the stored measurements to the controller 118, the inline detector 124a, and/or the container detector 124b.

Figure 4:
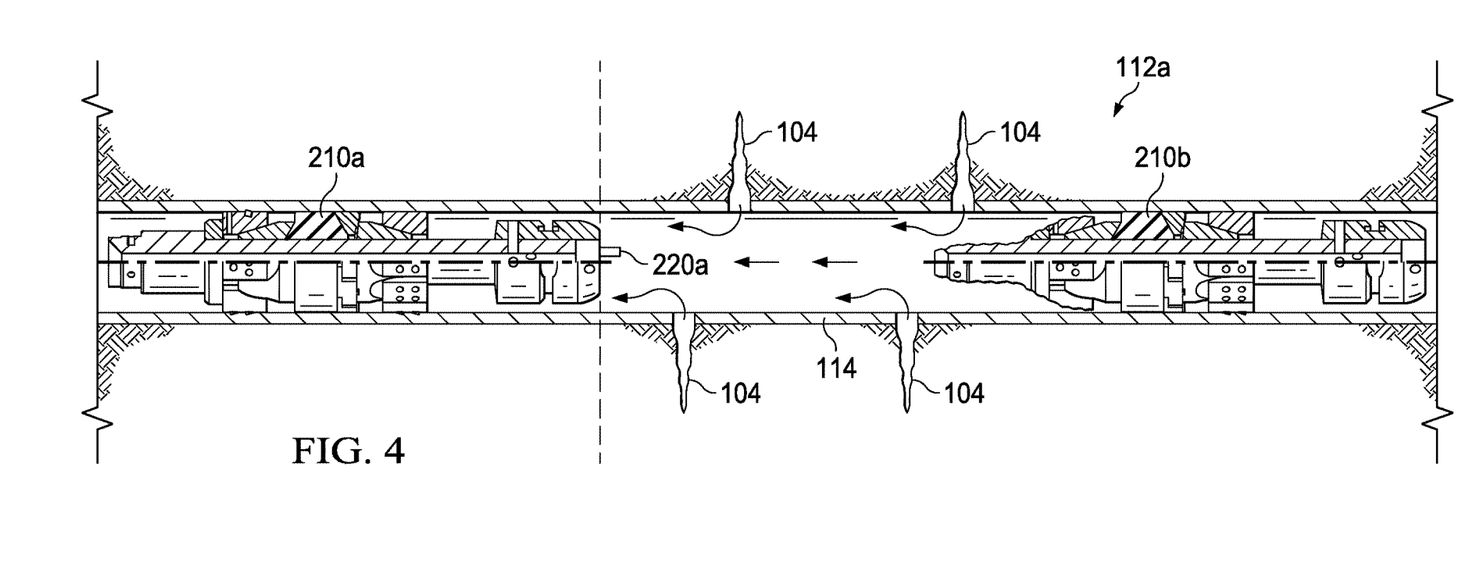
FIG. 4 is a schematic, side view of the partially dissolved frac plug of FIG. 2.

FIG. 4 is a schematic, side view of a partially dissolved frac plug 210b of FIG. 2. The first data logging device 220a is released into the wellbore fluid once a portion of the frac plug 210b dissolves due to contact with the wellbore fluid. The first data logging device 220a is then carried by the wellbore fluid and/or fluidly hydrocarbon resources along a return fluid flow path. In some embodiments, a sensor of the first data logging device 220a detects the release of the first data logging device 220a and the accelerometer of the first data logging device 220a wakes from an idle mode or changes a sampling rate. As the frac plug 210b travels along the first zone 112a of the target region 150, the sensor of the first data logging device 220a periodically measures the acceleration of the first data logging device, fluid properties of the wellbore fluid, acoustic emissions of the wellbore 114 proximate to the first data logging device 220a, as well as other suitable measurements discussed herein, and stores the measurements in the machine-readable medium of the first data logging device 220a.

The return flow path is obstructed at the zone boundary of the first zone 112a by frac plug 210a, which has not yet dissolved due to contact with the wellbore fluid. In some embodiments, the first data logging device 220a includes an accelerometer, a fluid properties sensor, an acoustic emissions sensor, and a vibrations sensor. The accelerometer of the first data logging device 220a, upon determining that the first data logging device 220a is no longer in motion, decreases the rate at which acceleration is measured. In such embodiments, acceleration is measured at the decreased rate while the return flow path remains obstructed by the frac plug 210a. Although acceleration is measured at a decreased rate, the fluid properties sensor continues to measure the fluid properties of the surrounding wellbore fluid. Further, the acoustic emissions sensor and the vibrations sensor continue to measure acoustics and vibrations proximate to the first data logging device 220a to determine whether perforation guns are being fired in the next zone. The accelerometer then increases the rate at which acceleration is measured once a portion of the frac plug 210a is dissolved to allow the first data logging device 220a to continue along the return flow path to the surface 108. Alternatively, the accelerometer continues to measure the acceleration at the decreased rate even after the first data logging device 220a is released from the frac plug 210a to allow the acoustic emissions sensor and the vibrations sensors to continue to measure acoustics and vibrations. Other sensors contemplated herein, including without limitation temperature sensors, pressure sensors, and fluid property sensors may be similarly operated.

As the frac plug 210b continues along the return flow path to the surface 108, the first data logging device 220a may receive, from the inline detector 124a, signals indicative of a request to provide the inline detector 124a with measurements stored in the machine-readable medium. In response, the first data logging device 220a may transmit, via the wireless transmission module described herein, measurements of various wellbore conditions stored in the machine-readable medium to the inline detector 124a.

In some embodiments (as shown in FIG. 1), the return flow path terminates in the container 130, which contains at least one compartment for collecting and storing the first data logging device 220a. In one of such embodiments, the first data logging device 220a communicates with the container detector 124b or the controller 118 once the first data logging device 220a is proximate to the surface 108 or is in the container 130. In such embodiment, the RFID device, NFC device, or the transmitter of the first data logging device 220a transmits measurements of various wellbore conditions stored in the machine-readable medium to the container detector 124b and/or the controller 118. In another one of such embodiments, an operator accesses the container 130 to obtain the first data logging device 220a and to access the machine-readable medium of the first data logging device 220a to obtain measurements of various wellbore conditions stored in the machine-readable medium.

Figure 5:
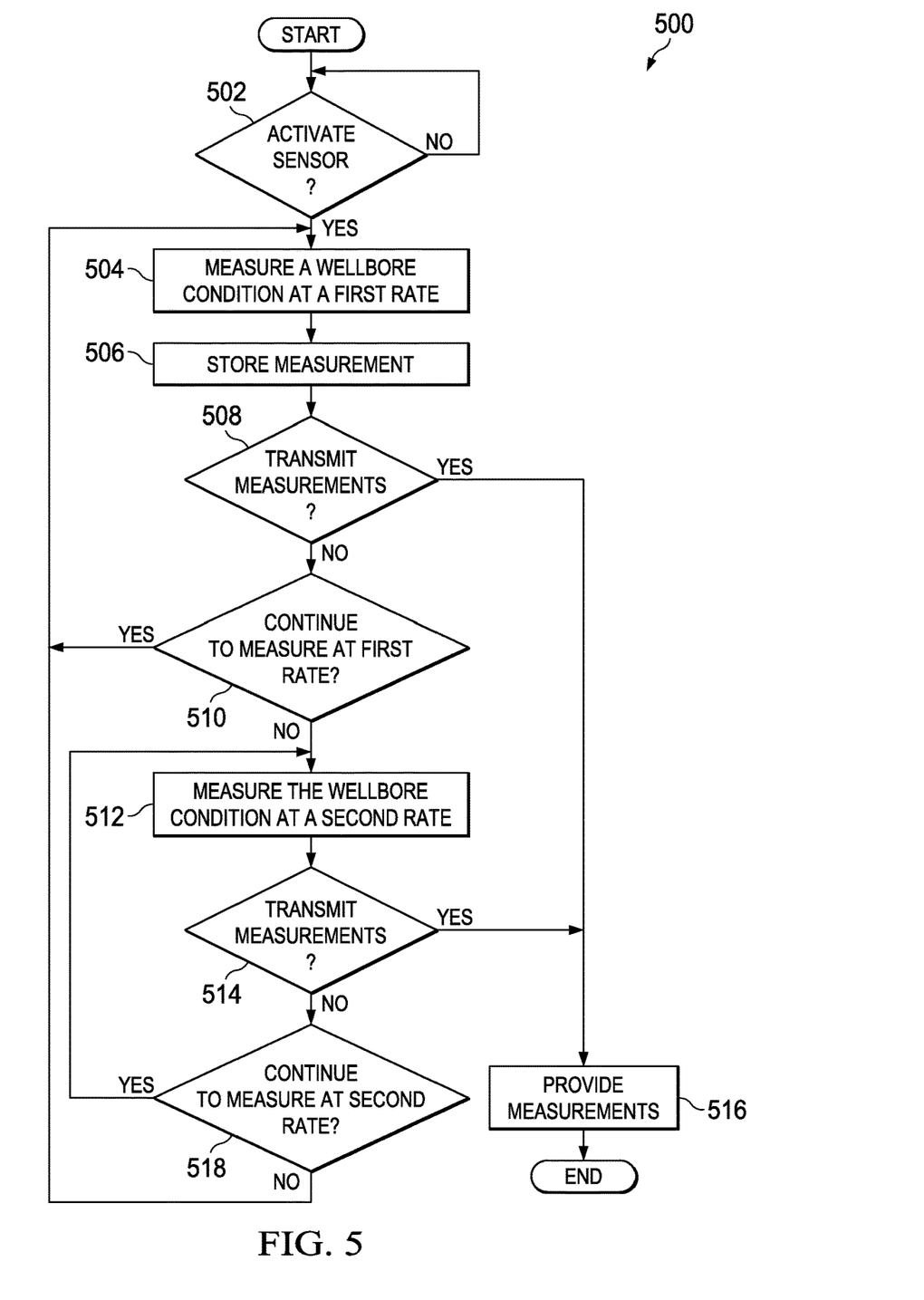
FIG. 5 is a flow chart illustrating a process for obtaining measurements of a wellbore.

FIG. 5 is a flow chart illustrating a process 500 for obtaining measurements of a wellbore. Although the operations in the process 500 are shown in a particular order, certain operations may be performed in different orders or at the same time where feasible. Further, although the first data logging device 220a is operable to perform the steps of process 500, the operations may also be performed by other data logging devices or devices operable to obtain measurements of a wellbore.

At step 502, the first data logging device 220a determines whether to activate a sensor to determine a wellbore condition proximate to the first data logging device 220a, such as, temperature, steady state pressure, dynamic pressure, fluid properties, acoustic emissions, vibration, acceleration, magnetic field, or similar wellbore conditions. The determination may be made on a measured condition, operator instruction, or an actuation signal. If the first data logging device 220a determines that the sensor should not be activated, then the process waits for a period of time before returning to step 502. Alternatively, if the first data logging device 220a determines that the sensor should be activated then the sensor is activated and the process proceeds to step 504. The sensor, at step 504, measures a wellbore condition at a first rate. The process then proceeds to step 506, and measurements made by the sensor are stored in a machine-readable medium of the first data logging device 220a.

At step 508, the first data logging device 220a determines whether to transmit the measurements stored in the machine-readable medium. In some embodiments, the first data logging device 220a determines to transmit the measurements in response to receiving a signal indicative of a request for the measurements. The signal may be transmitted from a controller, such as the controller 118, or from a detector, such as the inline detector 124a, or container detector 124b. In other embodiments, the first data logging device 220a transmits the measurements stored in the machine-readable medium in response to detecting presence of the controller 118, the inline detector 124a, or the container detector 124b. If the first data logging device 220a determines to transmit the measurements, then the process proceeds to step 516 and the measurements are provided to the controller 118, the inline detector 124a, or the container detector 124b. Alternatively, if the first data logging device 220a determines not to transmit the measurements, the process proceeds to step 510 and the first data logging device 220a determines whether to continue to measure the wellbore condition at the first rate. If the first data logging device 220a determines to continue to measure the wellbore condition at the first rate, then the process returns to step 504. Alternatively, if the first data logging device 220a determines not to measure the wellbore condition at the first rate, the process proceeds to step 512, and the wellbore sensor is measured at a second rate, where the second rate is slower than the first rate. At step 514, if the first data logging device 220a determines to transmit the measurements stored in the machine-readable medium, then the process proceeds to step 516. Alternatively, if the first data logging device 220a determines not to transmit the measurements stored in the machine-readable medium, then the process proceeds to step 518. At step 518, if the first data logging device 220a determines to continue to measure the wellbore condition at the second rate, then the process proceeds to step 512. Alternatively, if the first data logging device 220a determines not to measure the wellbore condition at the second rate, the process returns to step 504. Here again, the determination may be made on a measured condition, operator instruction, or an actuation signal.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

The present disclosure may also be understood as including at least the following clauses:

Clause 1: A method of obtaining measurements of a wellbore, the method comprising: measuring, by a sensor of a wellbore isolation device, at least one condition of the wellbore proximate to the sensor, the wellbore isolation device having a dissolvable portion, and the sensor being releasable from the wellbore isolation device upon dissolution of the dissolvable portion; storing measurements of the at least one condition of the wellbore in a machine-readable medium of the sensor; and providing the stored measurements of the sensor to a controller following dissolution of the dissolvable portion.

Clause 2: The method of clause 1, wherein measuring by the sensor comprises measuring the at least one condition of the wellbore proximate to the sensor while the wellbore isolation device travels down the wellbore to a designated location.

Clause 3: The method of either of clauses 1 or 2, wherein measuring by the sensor comprises measuring the at least one condition of the wellbore proximate to the sensor during a fracking operation.

Clause 4: The method of clause 3, wherein the measuring by the sensor further comprises measuring the at least one condition of the wellbore proximate to the sensor while the sensor travels from the designated location towards a surface location.

Clause 5: The method of any of clauses 1-4, further comprising adjusting, by the sensor, a rate of the measuring and storing based on a condition of the at least one measured condition of the wellbore proximate to the sensor.

Clause 6: The method of any of clauses 1-5, wherein measuring by the sensor comprises measuring a temperature of the wellbore proximate to the sensor, and wherein the adjusting by the sensor comprises increasing the rate of the measuring and storing if the measured temperature is below a threshold.

Clause 7: The method of any of clauses 1-6, wherein measuring by the sensor comprises measuring an acoustic level at the wellbore proximate to the sensor, and wherein the adjusting by the sensor comprises increasing the rate of the measuring and storing if the measured acoustic level is above the threshold.

Clause 8: The method of any of clauses 1-7, wherein measuring the at least one condition of the wellbore proximate to the sensor comprises measuring at least one of a temperature, pressure, pressure change, acoustic signals, vibration level, acceleration, and magnetic field.

Clause 9: The method of any of clauses 1-8, further comprising providing an identification of the wellbore isolation device to the controller.

Clause 10: The method of any of clauses 1-9, further comprising: capturing the sensor as the sensor flows along a return flow path from a deployment location of the wellbore isolation device; and detecting the sensor as the sensor flows along the return flow path.

Clause 11: The method of any of clauses 1-10, further comprising obtaining, from the sensor, the measurements of the at least one condition of the wellbore stored in the machine-readable medium.

Clause 12: A data logging device, the device comprising: a housing being coupled to a dissolvable portion of a wellbore isolation device; a sensor disposed within the housing and operable to measure at least one condition of the wellbore; and a storage medium for storing the measurements of the at least one condition of the wellbore proximate to the sensor, wherein the data logging device is releasable from the wellbore isolation device following dissolution of the dissolvable portion.

Clause 13: The device of clause 12, wherein the sensor comprises a temperature sensor component for determining a temperature of the wellbore proximate to the sensor.

Clause 14: The device of either of clauses 12 or 13, wherein the sensor comprises an accelerometer component for measuring an acceleration of the device.

Clause 15: The device of any of clauses 12-14, wherein the sensor comprises a vibration sensing component for measuring vibrations proximate to the sensor.

Clause 16: The device of any of clauses 12-15, wherein the sensor comprises a magnetometer component for measuring a magnetic field of the wellbore proximate to the sensor.

Clause 17: The device of any of clauses 12-16, wherein the sensor is a microelectromechanical device having psi rating of up to 30,000 and a temperature rating of up to 450° F.

Clause 18: A machine-readable medium comprising instructions stored therein, which when executed by one or more processors, cause the one or more processors to perform operations comprising: measuring, by a sensor of a wellbore isolation device, at least one condition of the wellbore proximate to the sensor, the wellbore isolation device having a dissolvable portion, and the sensor being releasable from the wellbore isolation device upon dissolution of the dissolvable portion; storing measurements of the at least one condition of the wellbore in a machine-readable medium; and adjusting, by the sensor, a rate of the measuring and storing based on a condition of the at least one measured condition of the wellbore proximate to the sensor.

Clause 19: The machine-readable medium of clause 18, wherein measuring by the sensor comprises measuring the at least one condition of the wellbore proximate to the sensor while the wellbore isolation device is maintained at a designated location.

Clause 20: The machine-readable medium of clause 18 or 19, wherein measuring by the sensor comprises measuring the at least one condition of the wellbore proximate to the sensor while the wellbore isolation device travels through the wellbore to a designated location.

Clause 21: The machine-readable medium of any of clauses 18-20, wherein the operations further comprise providing the stored measurements of the sensor to a controller following dissolution of the dissolvable portion.

What is claimed is:

1. A method of obtaining measurements of a wellbore, the method comprising:
   introducing a wellbore isolation device comprising a sensor into the wellbore, wherein the sensor is disposed about an outer diameter of the wellbore isolation device;
   measuring, by the sensor of a wellbore isolation device, at least one condition of the wellbore proximate to the sensor, the wellbore isolation device having a dissolvable portion, and the sensor being releasable from the wellbore isolation device upon dissolution of the dissolvable portion, wherein the sensor begins measuring upon introduction into the wellbore;
   storing measurements of the at least one condition of the wellbore in a machine-readable medium of the sensor; and
   providing the stored measurements of the sensor to a controller following dissolution of the dissolvable portion.

2. The method of claim 1, wherein measuring by the sensor comprises measuring the at least one condition of the wellbore proximate to the sensor while the wellbore isolation device travels down the wellbore to a designated location.

3. The method of claim 1, wherein measuring by the sensor comprises measuring the at least one condition of the wellbore proximate to the sensor during a fracking operation.

4. The method of claim 3, wherein the measuring by the sensor further comprises measuring the at least one condition of the wellbore proximate to the sensor while the sensor travels from a designated location towards a surface location.

5. The method of claim 1, further comprising adjusting, by the sensor, a rate of the measuring and storing based on a condition of the at least one measured condition of the wellbore proximate to the sensor.

6. The method of claim 5, wherein measuring by the sensor comprises measuring a temperature of the wellbore proximate to the sensor, and wherein the adjusting by the sensor comprises increasing the rate of the measuring and storing if the measured temperature is below a threshold.

7. The method of claim 5, wherein measuring by the sensor comprises measuring an acoustic level at the wellbore proximate to the sensor, and wherein the adjusting by the sensor comprises increasing the rate of the measuring and storing if the measured acoustic level is above a threshold.

8. The method of claim 1, wherein measuring the at least one condition of the wellbore proximate to the sensor comprises measuring at least one of a temperature, pressure, pressure change, acoustic signals, vibration level, acceleration, and magnetic field.

9. The method of claim 1, further comprising providing an identification of the wellbore isolation device to the controller.

10. The method of claim 1, further comprising:
    capturing the sensor as the sensor flows along a return flow path from a deployment location of the wellbore isolation device; and
    detecting the sensor as the sensor flows along the return flow path.

11. The method of claim 10, further comprising obtaining, from the sensor, the measurements of the at least one condition of the wellbore stored in the machine-readable medium.

12. A machine-readable medium comprising instructions stored therein, which when executed by one or more processors, cause the one or more processors to perform operations comprising:
    measuring, by a sensor of a wellbore isolation device, at least one condition of a wellbore proximate to the sensor, the wellbore isolation device having a dissolvable portion, and the sensor being releasable from the wellbore isolation device upon dissolution of the dissolvable portion, wherein the sensor begins measuring upon introduction into the wellbore, wherein the sensor is disposed about an outer diameter of the wellbore isolation device;
    storing measurements of the at least one condition of the wellbore in a machine-readable medium; and
    adjusting, by the sensor, a rate of the measuring and storing based on a condition of the at least one measured condition of the wellbore proximate to the sensor.

13. The machine-readable medium of claim 12, wherein measuring by the sensor comprises measuring the at least one condition of the wellbore proximate to the sensor while the wellbore isolation device is maintained at a designated location.

14. The machine-readable medium of claim 12, wherein the operations further comprise providing the stored measurements of the sensor to a controller following dissolution of the dissolvable portion.

* * * * *